No. 742,253. PATENTED OCT. 27, 1903.
J. E. STARR.
PRESSURE AND TEMPERATURE REGULATOR FOR THE ABSORBERS AND RETURN LINES OF REFRIGERATING APPARATUS.
APPLICATION FILED DEC. 13, 1895. RENEWED MAR. 7, 1903.
NO MODEL.
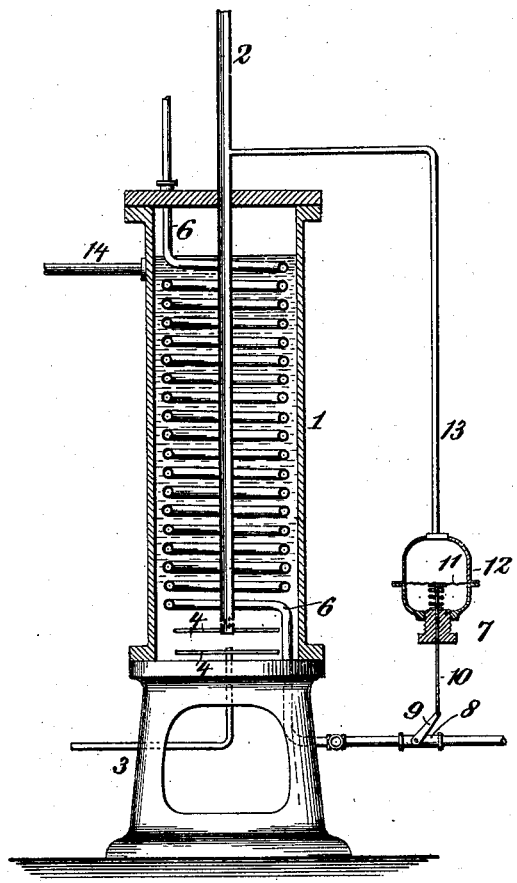
Witnesses:—
Inventor:-
John E. Starr
By E. M. Marble
Attorneys No. 742,253. Patented October 27, 1903.

UNITED STATES PATENT OFFICE.

JOHN EDWIN STARR, OF ST. LOUIS, MISSOURI, ASSIGNOR TO INTERNATIONAL COOLING COMPANY, OF NEW YORK, N. Y., A CORPORATION OF WEST VIRGINIA.

PRESSURE AND TEMPERATURE REGULATOR FOR THE ABSORBERS AND RETURN-LINES OF REFRIGERATING APPARATUS.

SPECIFICATION forming part of Letters Patent No. 742,253, dated October 27, 1903.

Application filed December 13, 1895. Renewed March 7, 1903. Serial No. 146,755. (No model.)

*To all whom it may concern:*

Be it known that I, JOHN EDWIN STARR, a citizen of the United States, residing at St. Louis, in the State of Missouri, have invented certain new and useful Improvements in Pressure and Temperature Regulators for the Absorbers and Return-Lines of Refrigerating Apparatus; and I do hereby declare the following to be a full, clear, and exact description of the invention, such as will enable others skilled in the art to which it appertains to make and use the same.

My invention relates to refrigerating apparatus, and particularly to an improvement in the absorber of absorption refrigerating-machines, whereby a uniform back pressure in the return-line may be maintained.

My invention consists in the novel means employed for regulating and maintaining a uniform back pressure in the return-line and in the novel combination and arrangement of the parts of the apparatus.

The objects of my invention are, first, to provide means for regulating back pressure in the return-line of absorption refrigerating apparatus and for maintaining a constant pressure, and, second, to make the apparatus simple, inexpensive, efficient, and entirely automatic in its action. These objects are attained in the apparatus herein described, and illustrated in the drawing which accompanies and forms a part of this application, in which the same reference-numerals indicate the same or corresponding parts and in which the figure there shown shows a central vertical section of the absorber of an absorption refrigerating-machine constructed in accordance with my invention.

In absorption refrigerating-machines where the machine works on an unsteady load, as where it supplies a street pipe-line, the amount of refrigerant required in the line, and consequently the amount of gas returning to the absorber, varies considerably from time to time. As a result the heat generated in the absorber of the machine by the absorption of the gas, usually ammonia, into the weak liquor of the absorber varies. Variation of the temperature of the aqua-ammonia within the absorber causes a corresponding variation in pressure in the absorber. The variation of the temperature in the absorber, due to variation in the rate of flow of the ammonia into the absorber, therefore causes variation in the pressure in the absorber, and consequently variation in the pressure in the return-line. For many reasons—as, for instance, the maintenance of uniform temperature in the refrigerators in the line—it is very desirable that the pressure in the return-line should be kept as nearly constant and uniform as possible, also variation of the temperature in the absorber, since thereby the capacity of water for holding ammonia in solution is varied varies the strength of the strong aqua-ammonia flowing from the absorber. In absorbers now in use it is the practice to cool the liquor in the absorber while the process of absorption is going on, so that as large an amount of ammonia-gas may be absorbed into the liquor and as strong a solution of ammonia obtained as possible by passing cooling water through cooling-coils located within the absorber. By my invention I provide means for keeping the pressure in the absorber, and therefore in the return-line, practically constant, and this I do by providing an automatic valve operated by the pressure in the return-line for regulating the rate of flow of cooling-water through cooling-coils in the absorber, so that if the temperature in the absorber rises more cooling-water will be caused to pass through the cooling-coils, thereby reducing the temperature in the absorber and reducing the pressure in the absorber and return-line. This valve may be so adjusted as to keep the pressure and temperature in the absorber practically constant through considerable variations in the amount of ammonia flowing into the absorber.

In the drawing, 1 is the absorber. The ammonia from the return-line passes into the absorber through a pipe 2, connected with the return-line and extending nearly to the bottom of the absorber. The weak liquor or aqua-ammonia is introduced into the bottom of the absorber through a pipe 3, and distributing-plates 4 4 are employed to distribute or diffuse the streams of gas and weak liquor flowing into the absorber. In the absorber is a passage formed by a coil or series of coils of pipe 6, through which cooling-water may be introduced into the absorber to take therefrom the heat generated by absorption of the ammonia into the weak liquor. At the end of the cooling-coils, and preferably outside of the absorber, is a pressure-operated valve 7, controlling the flow of cooling-water through the cooling-coils. Any form of pressure-operated valve may be used, and I do not limit myself to any particular form, but may use any form of valve capable of performing the hereinafter-described functions. Moreover, instead of pressure-operated valves a thermostatic valve operated by or through variations in temperature within the absorber may be used, being, in fact, merely an equivalent for the pressure-operated valve, as the temperature and pressure vary together. A pressure-operated valve is preferable, however, as by it the valve may be operated more directly. The particular form of valve illustrated in the drawing consists of a valve proper, 8, having a lever 9, connected by a rod 10 with a diaphragm 11 within a chamber 12. That portion of this chamber 12 which is above the diaphragm is connected by a pipe 13 with the return-line 2, so that variation in pressure within the return-line causes variations in position of the diaphragm, which moves the lever 9 and opens or closes, as may be the case, the valve proper, 8, so regulating the flow of cooling-water through the cooling-coils. As the ammonia is absorbed into the weak liquor and the solution grows stronger it rises to the top, being lighter. A pipe 14, near the top of the absorber, serves to draw off the strong liquor.

The operation of my absorber is as follows: The absorber is first filled with weak liquor through the pipe 3 nearly to the level of the pipe 14. The gas from the return-line being then admitted through the pipe 2, it combines with the weak liquor within the absorber, the liquor rising to the top of the absorber as it grows stronger, and when the liquor in the top of the absorber has reached the desired degree of strength the admission of weak liquor through the pipe 23 may again be begun, so as to raise the level of the fluid in the absorber and to permit the strong liquor to flow out through the pipe 14. As ammonia-gas combines with the liquor in the absorber heat is generated, and to keep the liquor in the absorber cool cooling-water is passed through the pipe. If the temperature in the absorber rises too high, since its pressure also rises with its temperature, the pressure-operated regulator-valve 7 will permit more water to flow through the cooling-coils 6, thus reducing the temperature of the liquor in the absorber. If, on the other hand, the temperature of the liquor in the absorber should fall too low, the pressure-operated valve 7 will check the flow of water through the coils 6 partly or entirely, thus permitting the temperature to rise and maintaining a constant and uniform temperature and pressure in the absorber. This accomplishes the object before stated—viz., the maintenance of constant pressure and temperature in the absorber, and therefore constant pressure in the return-line.

I employ the term "regulator" in the following claims as meaning a device for varying and adjusting to such degree as may be required the flow of cooling agent or fluid with a view to the maintenance of substantial uniformity of pressure and temperature in the absorber, and I do not intend to include thereby devices capable merely of throwing a valve open and of closing the same, but incapable of effecting intermediate adjustments or of otherwise maintaining substantial uniformity of pressure and temperature.

Having thus completely described my invention, what I claim, and desire to secure by Letters Patent, is—

1. In an absorption apparatus, the combination, with an absorber having cooling-passages through which a cooling agent may pass, of a valve arranged to open and close said passages, and an automatic regulator operated by variations of pressure and temperature in the absorber and operating said valve, and adapted thereby to maintain uniform back pressure in the return-line.

2. In an absorption apparatus, the combination, with an absorber having within it cooling coils or passages through which a cooling fluid may flow, of a valve arranged to open and close said coils, an automatic regulator, operated by variations of pressure and temperature in the absorber and operating said valve, and adapted thereby to maintain uniform back pressure in the return-line.

3. In an absorption apparatus, the combination, with an absorber having within it cooling coils or passages, through which a cooling fluid may flow, of an automatic pressure-operated regulating-valve, operated by variations of pressure and temperature in the absorber, controlling the flow of cooling fluid through said coils, and adapted thereby to maintain uniform back pressure in the return-line.

4. In a refrigerating apparatus, the combination, with an absorber, cooling pipes or passages therefor, and a valve regulating the flow of cooling fluid through said pipes or passages, of a chamber in communication with the interior of the absorber, and a valve-operating device within said chamber so as to be exposed to variations in internal pressure in the absorber, controlling said valve.

In testimony whereof I affix my signature in presence of two witnesses.

JOHN EDWIN STARR.

Witnesses:
M. WILSON,
H. M. MARBLE.